US007411943B2

United States Patent
Kittredge et al.

(10) Patent No.: US 7,411,943 B2
(45) Date of Patent: *Aug. 12, 2008

(54) SYSTEM AND METHOD FOR PROCESSING A PLURALITY OF REQUESTS FOR A PLURALITY OF MULTI-MEDIA SERVICES

(75) Inventors: Barbara Joanne Kittredge, Brunswick, ME (US); Harish Samarasinghe, Holmdel, NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/735,858

(22) Filed: Apr. 16, 2007

(65) Prior Publication Data

US 2007/0286166 A1 Dec. 13, 2007

Related U.S. Application Data

(63) Continuation of application No. 10/298,484, filed on Nov. 18, 2002, now Pat. No. 7,206,307.

(51) Int. Cl.
*H04L 12/66* (2006.01)
*H04L 12/28* (2006.01)
*H04L 12/56* (2006.01)

(52) U.S. Cl. .................. 370/352; 370/356; 370/395.52

(58) Field of Classification Search .................. 370/352, 370/356, 395, 260, 432, 401, 474, 466, 400, 370/496; 709/228, 223, 224, 225, 226, 217, 709/227; 379/265, 219, 221, 266, 220, 229, 379/270, 198, 142, 196, 224, 210, 230; 715/723, 715/719, 721

See application file for complete search history.

(56) References Cited

U.S. PATENT DOCUMENTS

| 5,771,282 A | 6/1998 | Friedes |
| 5,864,563 A | 1/1999 | Ratcliffe |
| 5,898,769 A | 4/1999 | Furman |
| 5,915,013 A | 6/1999 | Mintz et al. |

(Continued)

OTHER PUBLICATIONS

U.S. Appl. No. 10/216,001, filed Aug. 8, 2002, System and Method for Providing Multi-Media Services to Communication Devices Over a Communications Network, Robert Y. Peters, Jr., et al.
U.S. Appl. No. 10/236,623, filed Sep. 6, 2002, System and Method for Providing Multi-Media Services to Communication Devices Over a Communications Network, Robert Y. Peters, Jr., et al.
U.S. Appl. No. 10/236,157, filed Sep. 6, 2002, System and Method for Providing Multi-Media Services to Communication Devices Over a Communications Network, Robert Y. Peters, Jr., et al.

(Continued)

*Primary Examiner*—Wing F. Chan
*Assistant Examiner*—Prenell P Jones

(57) ABSTRACT

A system and method for processing a plurality of requests for a plurality of multi-media services received at a Private Service Exchange (PSX) from a plurality of IP-communication devices. The system includes an IP Segmentation Directory (IP-SD) coupled to the PSX and to a plurality of IP Service Control Points (IP-SCPs), which are operative to process the plurality of requests for the plurality of multi-media services. The PSX is adapted to receive, process and redirect the plurality of requests for the plurality of multi-media services to the IP-SD. The IP-SD further receives, processes and selectively redirects the plurality of requests for the plurality of multi-media services to a predetermined IP-SCP of the plurality of IP-SCPs based on attributes of each of the plurality of requests for the plurality of multi-media services.

15 Claims, 2 Drawing Sheets

U.S. PATENT DOCUMENTS

| | | | |
|---|---|---|---|
| 5,923,742 | A | 7/1999 | Kodialam et al. |
| 5,983,217 | A | 11/1999 | Khosravi-Sichani et al. |
| 6,101,494 | A | 8/2000 | Khosravi-Sichani et al. |
| 6,148,071 | A | 11/2000 | Friedes et al. |
| 6,178,400 | B1 | 1/2001 | Eslambolchi |
| 6,377,674 | B1 | 4/2002 | Chong et al. |
| 6,661,785 | B1 * | 12/2003 | Zhang et al. ............... 370/352 |
| 6,847,631 | B1 * | 1/2005 | Lawser et al. .............. 370/352 |
| 6,963,561 | B1 * | 11/2005 | Lahat ........................ 370/356 |
| 7,180,912 | B1 | 2/2007 | Samarasinghe |
| 7,180,984 | B1 | 2/2007 | Samarasinghe |
| 7,206,307 | B1 * | 4/2007 | Kittredge et al. ........... 370/352 |
| 2006/0153202 | A1 * | 7/2006 | Dantu et al. .......... 370/395.52 |

OTHER PUBLICATIONS

U.S. Appl. No. 10/236,654, filed Sep. 6, 2002, System and Method for Providing Multi-Media Services to Communication Devices Over a Communications Network, Robert Y. Peters, Jr., et al.

U.S. Appl. No. 10/294,855, filed Nov. 26, 2002, Mixed Protocol Multi-Media Provider System Incorporating a Session Initiation Protocol Based Media Server Adapted to Form Preliminary Communications With Calling Communication Devices, Harish Samarasinghe.

U.S. Appl. No. 10/320,160, filed Dec. 16, 2002, System for Providing Multi-Media Services Incorporating a Service Broker Adapted to Selectively Direct a Call Request to One or More Processors for Processing the Call Request and/or to a Network Routing Element for Forming a Communication Path Between Two or More Communication Devices, Harish Samarasinghe.

U.S. Appl. No. 10/320,161, filed Dec. 16, 2002, Method for Providing Multi-Media Services Incorporating a Service Broker Adapted to Selectively Direct a Call Request to One or More Processors for Processing the Call Request and/or to a Network Routing Element for Forming a Communication Path Between Two or More Communication Devices, Harish Samarasinghe.

U.S. Appl. No. 10/324,198, filed Dec. 19, 2002, Session Initiation Protocol (SIP) Message Incorporating a Multi-Purpose Internet Mail Extension (MIME) Media Type for Describing the Content and Format of Information Included in the SIP Message, Robert Y. Peters, Jr., et al.

U.S. Appl. No. 10/354,371, filed Jan. 30, 2003, Session Initiation Protocol (SIP) Message Incorporating a Number of Predetermined Address Headers Having Predetermined Address Information, Robert Y. Peters, Jr., et al.

U.S. Appl. No. 10/375,820, filed Feb. 27, 2003, Call Control Element Constructing a Session Initiation Protocol (SIP) Message Including Provisions for Incorporating Address Related Information of Public Switched Telephone Network (PSTN) Based Devices, Harish Samarasinghe.

U.S. Appl. No. 10/384,223, filed Mar. 7, 2003, Method of Defining a SIP Message Body for Communications Between Core Network Elements, Harish Samarasinghe, et al.

U.S. Appl. No. 10/408,814, filed Apr. 7, 2003, Session Initiation Protocol (SIP) Messages Incorporating Address and/or Routing Information Obtained From a Contact Header of a Redirect Message, Sekar Ganesan, et al.

U.S. Appl. No. 60/465,680, filed Apr. 25, 2003, A Method for Providing Local and Toll Services With LNP, and Toll-Free Services to a Nodal Location Which Originates the Call From an IP Location Connected to a SIP-Enabled IP Network, Harish Samarasinghe, et al.

* cited by examiner

SYSTEM AND METHOD FOR PROCESSING A PLURALITY OF REQUESTS FOR A PLURALITY OF MULTI-MEDIA SERVICES

FIELD OF THE INVENTION

This application is a continuation of U.S. Ser. No.10/298,484 filed Nov. 18, 2002 now U.S. Pat. No. 7,206,307, the contents of which are incorporated by reference herein.

The present invention relates generally to a system and method for processing a plurality of requests for a plurality of multi-media services and, more specifically, to a system and method for processing a plurality of requests for a plurality of multi-media services by selectively directing the requests to predetermined service processors for processing based on predetermined attributes of the requests.

BACKGROUND

Present day providers of multi-media services, such as AT&T, can provide a number of basic services to customers operating various communication devices. For example, some of the basic multi-media services can include Software Defined Network (SDN) telecommunication service and/or toll-free dialing service, which services are communicated over Internet-Protocol ("IP") Networks to users of IP-based communication devices. Typically, each request for a basic service offering received over the IP Network from one or more of the IP-based communication devices is directed by a switching system to one of a number of different Service Control Points ("SCPs") or service processors for processing each of the requests.

As providers of multi-media services migrate basic multi-media services from the Legacy 4ESS Switched Network to a Voice over IP architecture, there is a need to support multiple IP-SCPs, which provide a number of multi-media services over the IP architecture. The multiple IP-SCPs each include an IP interface, which is adapted to provide a communication interface to customer logic that provides service processing on a per-call basis for each service request. Further, there is a need to provide an IP-compatible switching device that can support the multiple IP-SCPs and direct the number of requests to any one of the multiple IP-SCPs for processing.

SUMMARY OF THE INVENTION

In accordance with principles of the present invention, a system and method for processing a plurality of requests for a plurality of multi-media services received at a multi-media services provider system is set forth. The system processes the plurality of requests for the plurality of multi-media services by selectively directing the requests to predetermined service processors, which are located on the multi-media services provider system, for processing based on predetermined attributes of the requests.

In one aspect of the present invention, the multi-media services provider system includes an IP-compatible switching device adapted to receive and process the plurality of requests for multi-media services to generate a plurality of first processed requests for multi-media services. In one aspect, the IP-compatible switching device can include a Private Service Exchange. The system further includes at least one IP Segmentation Directory, which is coupled to the switching device. The IP Segmentation Directory is adapted to receive and process the plurality of first processed requests for multi-media services to generate a plurality of second processed requests for multi-media services.

The system additionally includes a plurality of IP Service Control Points, which are coupled to the at least one IP Segmentation Directory and to the switching device. The IP Segmentation Directory is operative to communicate at least one of the plurality of second processed service request messages to at least one predetermined IP Service Control Point of the plurality of IP Service Control Points for service processing based on predetermined attributes of the at least one of the plurality of second processed service request messages. For example, the predetermined attributes of the at least one of the plurality of second processed service request messages may include predetermined information associated with requesting Software Defined Network services. In another example, the predetermined attributes of the at least one of the plurality of second processed service request messages may include predetermined information associated with requesting Toll-Free services.

In one aspect, the plurality of first processed requests for multi-media services may include a plurality of first Info_Collected messages. In another aspect, the plurality of second processed requests for multi-media services may include a plurality of second Info_Collected messages.

In another aspect of the present invention, the method for processing the plurality of requests for the plurality of multi-media services received at the multi-media services provider system includes receiving at least one service request message having a request for a predetermined service at an IP-compatible switching device located on the system. The method further includes processing the at least one service request message at the switching device for generating a first processed service request message having the request for the predetermined service. The first processed service request message is further communicated to an IP Segmentation Directory, which is also located on the system. The IP Segmentation Directory processes the first processed service request message for generating a second processed service request message having the request for the predetermined service. In addition, the IP Segmentation Directory communicates the second processed service request message to at least one predetermined IP Service Control Point of a plurality of IP Service Control Points located on the system for processing the predetermined service.

The method further includes determining to communicate the second processed service request message to the at least one predetermined IP Service Control Point of the plurality of IP Service Control Points for service processing based on predetermined attributes of the predetermined service. In one aspect, the method includes determining that the request for the predetermined service includes a request for a Software Defined Network service. In another aspect, the method includes determining that the request for the predetermined service includes a request for toll-free service.

In one aspect, generating the first processed service request message includes generating a first Info_Collected message. Furthermore, communicating the first processed service request message may include communicating the first Info_Collected message to the IP Segmentation Directory. In another aspect, generating the first processed service request message may include generating an Info_Analyze message and communicating the Info_Analyze message to the IP Segmentation Directory.

In another aspect, generating the second processed service request message may include generating a second Info_Collected message. Furthermore, communicating the second processed service request message may include communicating the second Info_Collected message to the at least one predetermined IP Service Control Point.

BRIEF DESCRIPTION OF THE DRAWING

The foregoing and other objects of this invention, the various features thereof, as well as the invention itself, can be more fully understood from the following description when read together with the accompanying drawings, in which.

DETAILED DESCRIPTION OF THE INVENTION

Figure 1:
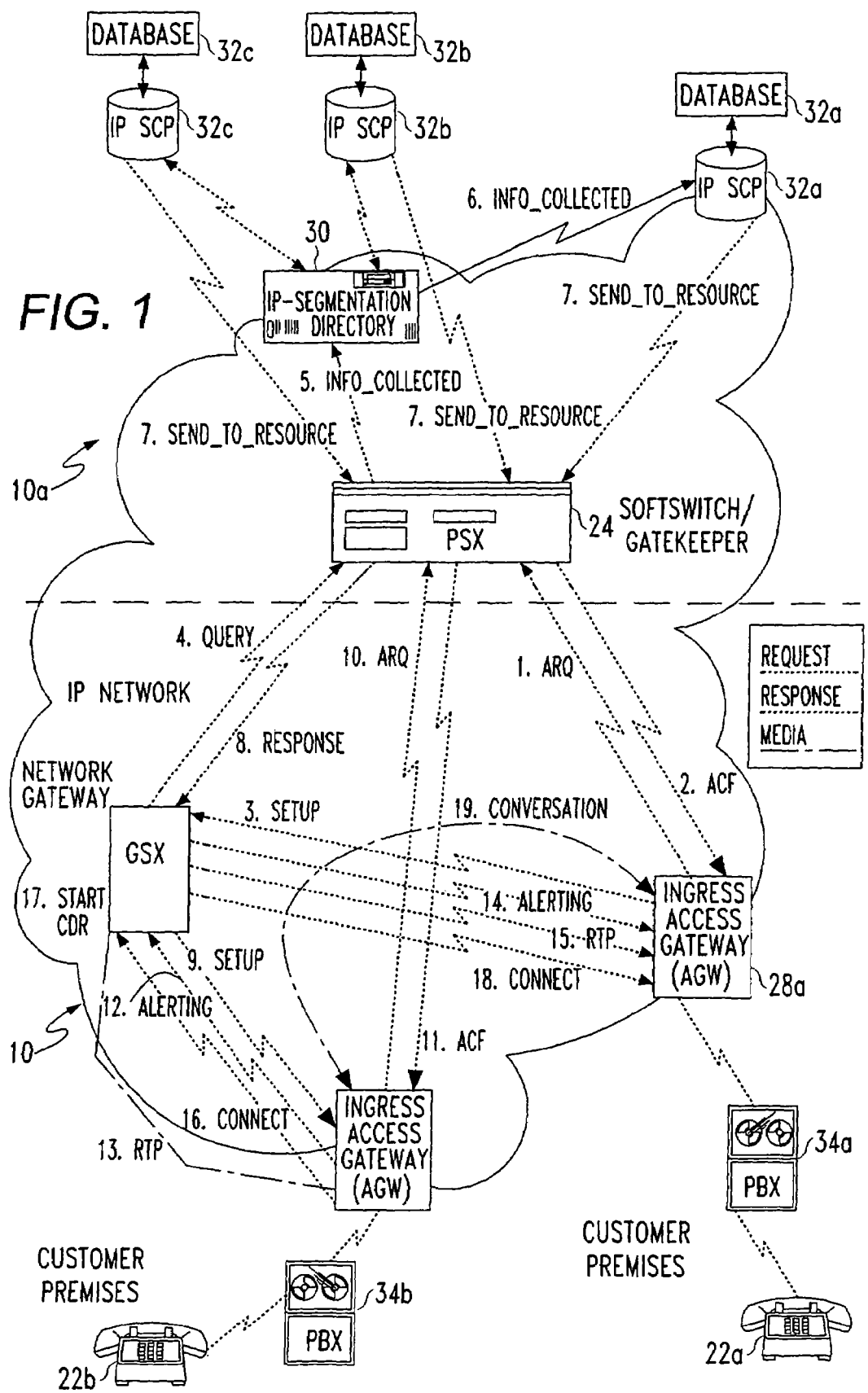
FIG. 1 is an exemplary high-level schematic block diagram of a system for providing multi-media communications between a plurality of communication devices according to the present invention.

Referring to FIG. 1, shown is an exemplary communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, as well as to a plurality of other communication devices not specifically shown herein.

The system 10a includes a centrally located Softswitch/Gatekeeper or Private Service Exchange 24 (hereinafter referred to as "PSX"), at least one Internet-Protocol Segmentation Directory ("IP-SD") 30 and a plurality of Internet-Protocol Service Control Points 32a, 32b, 32c (hereinafter referred to as "IP-SCPs"). The PSX 24 is coupled to at least one network gateway 2, as well as to at least a first 28a router (e.g. ingress access gateway) and a second 28b router (e.g. egress access gateway) of a plurality of routers. The PSX 24 is further coupled to the at least one IP-SD 30 and to the plurality of IP-SCPs 32a, 32b, 32c. The IP-SD 30 is also coupled to the number of IP-SCPs 32a, 32b, 32c.

In the exemplary embodiment, the first router 28a is coupled to the first communication device 22a via a first IP-Private Branch Exchange 34a (hereinafter referred to as "IP-PBX"). Further, the second router 28b is similarly coupled to a second communication device 22b, via a second IP-PBX 34b.

The PSX 24, for example, can be provided by Sonus Networks of Westford, Mass. The PSX 24 is adapted to serve as a proxy server for multi-media service requests received from the first 22a and/or second 22b communication devices. Furthermore, the PSX 24 supports a predetermined set of communication protocols or formats. In one embodiment, the predetermined set of communication protocols or formats includes an Artificial-Intelligence-Network Transactions Capabilities protocol or format (i.e. "AIN TCAP format," which is referred to hereinafter as "TCAP") which includes triggers that filter Policy Query in order for the PSX 24 to initiate TCAP queries to the IP-SD 30 when predefined conditions are met. The TCAP triggers defined at the PSX 24 adhere to the triggers defined at a Service Switching Point ("SSP") of an AIN Call model. The PSX 24 may have triggers, for example, that are activated by specific digit strings of the destination address of a destination communication device, such as the second communication device 22b. Furthermore, the PSX 24 may also set triggers on the origination address, such as the charge number, which may be associated with the calling or first communication device 22a, for example. In addition, before a call encounters any of the above-described triggers, the PSX 24 may provide pre-query screening.

In the exemplary embodiment, the network gateway 26 can be provided by Sonus Networks of Westford, Mass. and is referred to hereinafter as "GSX 26." In one embodiment, the GSX 26 relies on using an H.323 protocol for establishing Multi-Media sessions between the first 22a and second 22b communication devices.

The IP-SD 30, in the exemplary embodiment, can be provided by Lucent Corporation of Murray Hill, N.J. The IP-SD 30 includes a centralized Service Processor directory (not shown) that is adapted to perform an Automatic Number Identification (ANI) (a.k.a the charge number), and the Dialed Number (DN), and table lookups based on the information received in an AIN TCAP Info_Collected message, for example, or other messages, which are provided to the IP-SD 30 by the PSX 24. The IP-SD 30 is further adapted to process the Info_Collected message or other messages (e.g. Info_Analyze message) and to selectively redirect the Info_Collected message or other messages to a predetermined IP-SCP 32a, 32b, or 32c of the plurality of IP-SCPs 32a, 32b, 32c for feature processing, which will also be described below in further detail.

The first router 28a and the second router 28b can each include a conventional router, such as a "Cisco 12000," available from Cisco Corporation of San Jose, Calif. The routers 28a and 28b are adapted to receive a plurality of requests for multi-media services from the first 22a and second 22b communication devices, respectively, and to redirect the requests to the PSX 24 for further processing, which will be described below in further detail.

In the exemplary embodiment, the IP-SCPs 32a, 32b, 32c can each include a conventional computer server, such as an "NT-Server," which can be provided by Microsoft of Richmond, Washington or a "Unix Solaris Server," which can be provided by Sun Micro Systems of Palo Alto, Calif. These IP-SCPs 32a, 32b, 32c can be programmed with conventional Web-page interface software such as: "Visual Basic," "Java," "JavaScript," "HTML/DHTML," "C++," "J+," "Perl," or "Perlscript," and "ASP." These IP-SCPs 32a, 32b, 32c can further be programmed with an operating system, Web server software and Web Application software, such as an e-commerce application and computer network interface software. In addition, the IP-SCPs 32a, 32b, 32c can each be programmed with multi-media service software adapted to provide a plurality of multi-media services, as is known, such as 115DN telecommunication service, "Click-to-Dial," "Video Conferencing," "Virtual Private Networks," and "Toll-Free Calling or 800-Service."

Each of the databases 32a', 32b', 32c', which are respectively associated with each of the IP-SCPs 32a, 32b, 32c, contain a service intelligence layer adapted for providing the plurality of multi-media services described above. The intelligence layer may include customer logic and data, as well as common logic and data that is used by all communication devices or customers.

The IP-SCPs 32a, 32b, 32c may each be defined as a Session Initiate Protocol ("SIP") Server because the IP-SCPs 32a, 32b, 32c each receive requests from the PSX 24 via the IP-SD 30. In this capacity, the PSX 24 serves as a proxy server and provides multi-media service processing as requested by the first 22a and/or second 22b or communication devices. The IP-SCP 32a, 32b, 32c, each acting as the SIP server, can receive a service request message from the PSX 24, as described above, and thereafter can access the appropriate logic to provide multi-media services to the requesting communication device 22a or 22b which initiated the request for predetermined multi-media services.

The first 22a and second 22b communication devices can include a plurality of SIP-enabled devices, such as telephones, personal computers, IP-Private Branch Exchanges ("IP-PBXs"). In addition, the first 22a and second 22b communication devices can include a plurality of SIP-enabled wireless devices, such as cellular telephones, pagers and personal digital assistants ("PDAs").

Figure 2:
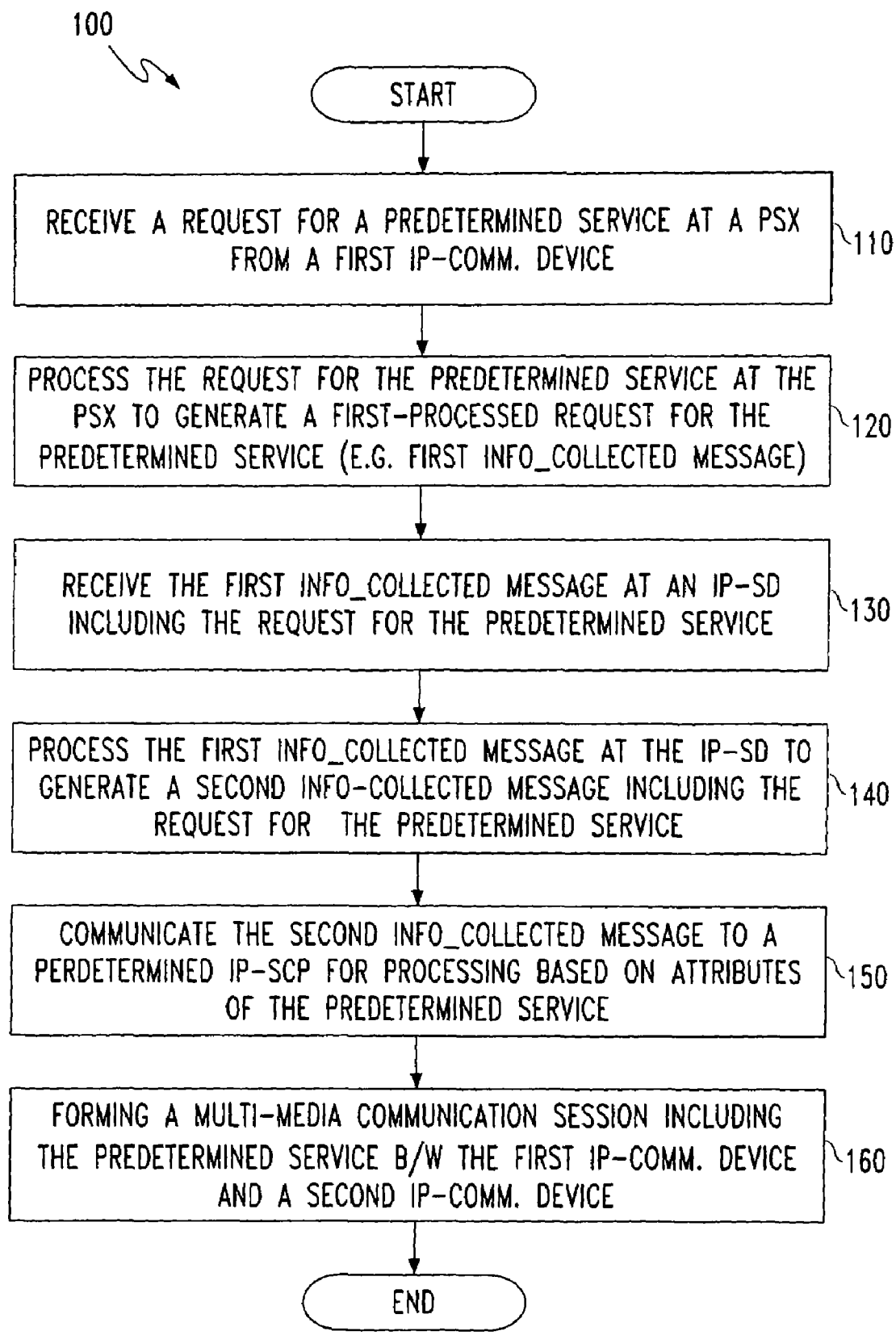
FIG. 2 is a high-level flow chart illustrating process steps executable on the system of FIG. 1.

Referring again to FIG. 1 and further to FIG. 2, which shows an exemplary call flow diagram for executing the method 100 on the system 10 of FIG. 1 to provide multi-media services between the first and second communication devices 22a, 22b, in accordance with the present invention. The method commences by a user of the calling or first communication device 22a, for example, dialing an SDN On-Net or Off-Net number, which first arrives at the PBX 34a. Based on the signaling interface, such as Channel Associated Signaling (CAS) or Integrated Service Digital Network Primary Rate Interface (ISDN-PRI), which provides transparent end-to-end digital connectivity to the first PBX 34a, the first PBX 34a can route the call to any one of a plurality of locations.

For example, if the call arrives at the first PBX 34a in the CAS interface, the first PBX 34a routes the call to the first router 28a, which is hereinafter defined as an ingress Access Gateway ("AGW") or IP network router. The call arrives at the ingress AGW 28a with the Called Party Number, which can be associated with the second communication device 22b, for example, along with other various information received in the call or inband-signaling message. The ingress AGW 28a processes the call by stripping any dialed number prefix, such as 011, and transforms this information into a RAS (Register, Admission, and Status) ARQ message.

Alternatively, if the call arrives at the first PBX 34a in the ISDN-PRI interface, the first PBX 34a routes the call to the IP network by sending a Q.931 Setup message to the GSX 26, which contains Bearer Capability (e.g. 3.1 kHz audio), Channel Identification, and the Called Party Number. The Called Party Number may include predetermined information, such as Type of Number/Numbering Plan with any dialed prefix removed, such as 011. The Setup message may also include Network-Specific Facilities and a Calling Party Number (including presentation indicator) which is associated with the first communication device in the exemplary embodiment.

Furthermore, the ingress AGW 28a formulates an ARQ message with relevant data (e.g., Calling Party Number, Called Party Number) and sends the ARQ message to the PSX 24. Upon receipt of the ARQ message at the PSX 24, the PSX 24 sends an H.323 ACF message to the ingress AGW 28a directing the ingress AGW 28a to route the call to the GSX 26, which is associated with the second communication device 22b. Upon receiving the ACF message at the ingress AGW 28a, the ingress AGW 28a sends an H.225 Setup message (requesting Fast Start) to the GSX 26 with the appropriate parameters. In response to receipt of the H.225 Setup message, the GSX 26 sends an appropriate Query message to the PSX 24 with all relevant data mapped from the Setup message, which was previously received from the ingress AGW 28a.

At step 110 of FIG. 2, the GSX sends the Query message to the PSX 24, which includes the request for the predetermined service. At step 120, in response to receipt of the Query message at the PSX 24, the PSX 24 processes the Query message including the request for the predetermined service and generates a first processed request for the predetermined service. In the exemplary embodiment, the first processed request for the predetermined service is defined herein as a "first Info_Collected message."

The PSX 24 processes the Query message by performing pre-query processing on the Called Party Number, including validating the dialed number and checking for escape codes. For example, the PSX can be configured to block predefined numbers, such as 900 and/or 411. In this exemplary embodiment, the call passes number validation and does not escape. If the number is 7 digits, the PSX 24 sets the collected address parameter in the first Info_Collected message, which is generated by the PSX 24, as NPT=ISDN and NoN=Subscriber Number, where NPT is defined herein as a Numbering Plan Type and NoN is defined herein as a Nature of Number. If the number is ten digits, then the NPT=ISDN and the NoN=National, and if the prefix is 011, then the NoN=International and the NPT=ISDN.

The PSX 24 further processes the Query message by mapping the collected parameters and provisioned data (e.g., Called Party Number, as described above) into the first Info_Collected message. After formulating the first Info_Collected message at the PSX 24, as described above, the PSX 24 routes the first Info_Collected message to the IP-SD 30. In the exemplary embodiment, the first Info_Collected message can include the following information:

```
Package Type = Query with Permission to Release
Component Type = Invoke(Last)
    Operation = infoCollected
    Parameters
    ChargeNumber
    CallingPartyID
    Carrier
    CollectedAddressInfo
```

In response to receiving the first Info_Collected message at the IP-SD 30, at step 130, the IP-SD 30 processes the first Info_Collected message to generate a second Info_Collected message, at step 140, which may be redirected to a predetermined IP-SCP 32a, 32b or 32c for service processing based on attributes of the requested service. In order to formulate the second Info_Collected message at the IP-SD 30, the IP-SD 30 processes the first Info_Collected message by subjecting the first Info_Collected message to a Directory Function Server ("DFS") (not shown), which is included on the IP-SD 30. Based on the information received in the first Info_Collected message, the DFS accesses a predetermined application included on the IP-SD 30, which is operative to execute any one of a number of IP-SD functions. The IP-SD functions include correlating data previously stored in the IP-SD 30 with data included in the first Info_Collected message, such as an Automatic Number Identification (ANI) or Dial Number (DN), to determine if the call is permitted. After processing the first Info_Collected message, as described above, the first Info_Collected message is redefined as a second processed request for a predetermined multimedia service. In the exemplary embodiment, the second processed request for the predetermined multi-media service is defined herein as a "second Info_Collected message."

Further, the IP-SD 24 populates the appropriate fields of the second Info_Collected message with predetermined routing information. Thereafter, the IP-SD 30 routes the second Info_Collected message to the predetermined IP-SCP 32a, 32b or 32c for service processing, at step 150. In the exemplary embodiment, the IP-SD 30 routes the second Info_Collected message to the IP-SCP 32a for service processing because IP-SCP 32a includes logic for providing SDN services. It should be understood that the IP-SD 30 can also route the second Info_Collected message to the IP-SCPs 32b, 32c or others not specifically shown herein depending on the requested service processing or feature processing initially requested by the user of the first communication device 22a.

Upon receipt of the second Info_Collected message at the IP-SCP 32a, the IP-SCP 32a executes the appropriate customer logic, which applies predetermined screening and feature processing for the second Info_Collected message. The IP-SCP 32a further processes the second Info_Collected message by accessing the ANI translation table, which is included in the second Info_Collected message, to read and map a charge number to a user or customer record ID. Using the customer record ID from the ANI translation table, the IP-SCP 32a executes an application that accesses the customer record and further executes customer logic to formulate an AIN TCAP Analyze_Route message, which includes an Analyze_Route operation and a Furnish_AMA operation. The IP-SCP 32a sends the Analyze_Route message with the routing and recording instructions to the PSX 24. In the exemplary embodiment, the Analyze_Route message can include the following information:

```
Package Type = Conversation with Permission to Release
Component Type = Invoke (Last)
    Operation = AnalyzeRoute
    Parameters
        ChargeNumber
        CallingPartyID
        CalledPartyID
        Carrier
        CollectedAddressInfo
        AMAslpID
Component Type = Invoke (last)
    Operation = Furnish_AMA
```

The PSX 24 receives the Analyze_Route message from the IP-SCP 32a and uses the CalledPartyID included therein to determine the route to the egress AGW 28b and the digit manipulation rule (delete and prefix on the Called Party Number) associated with the route. If the Called Party Number was signaled in the PSX 24 query, the PSX 24 will populate the Called Party Number signaled into the appropriate Response message provided to the GSX 26 along with the information the PSX 24 received in the Analyze_Route message. Since the destination is an IP endpoint (e.g. the second communication device 22b), the PSX 24 will include the translated and modified Called Party Number in the Response message provided to the GSX 26.

Upon receiving the information from the GSX 26, the GSX 26 sends an H.225 Setup (requesting Fast Start) with appropriate parameters mapped from the Response message to the egress AGW 28b. The Setup message can include the modified Called Party Number, which was previously modified at the PSX 24 during execution of the above-described digit manipulation rule at the PSX 24 (e.g., delete and prefix on the Called Party Number). Upon receiving the H.225 Setup message at the egress AGW 28b, the egress AGW 28b sends an H.323 ARQ message to the PSX 24 to determine whether the egress AGW 28b has permission to set up the call.

In the exemplary embodiment, the PSX 24 recognizes that the ARQ message has been sent from the egress AGW 28b requesting permission to set up the call. In response, the PSX 24 sends an ACF message back to the egress AGW 28b indicating that it can proceed with the call. Thereafter, the egress AGW 28b sends the call to the called entity, which is the second communication device 22b, in this example, using the appropriate inband protocol or Setup message with the modified Called Party Number, if available, for ISDN PRI.

The egress AGW 28b further sends an H.225 Alerting message to the GSX 26. The Real Time Transport Protocol (RTP), which carries the media such as audio/video channel, is opened between the egress AGW 28b and the GSX 26. Upon receipt of the H.225 Alerting message from the egress AGW 28b, the GSX 26 sends an H.225 Alerting message to the ingress AGW 28a. The RTP/RTCP channel is opened between the ingress AGW 28a and the GSX 26. Thereafter, the egress AGW 28b can detect if the called entity or user of the second communication device is off-hook (e.g. ready to commence a multi-media session). Furthermore, the egress AGW 22b sends a first H.225 Connect message to the GSX 26. In response to receipt of the first Connect message, the GSX 26 generates a Start Call Detail Record (CDR). The GSX 26 further sends a second H.225 Connect message to the ingress AGW 28a. At this instant and in accordance with step 160, a multi-media communications link is formed between the first 22a and second 22b communication devices, via the ingress AGW 28a and the egress AGW 28b (RTP end-to-end), which includes the requested multimedia service.

Although not specifically shown in the figures, the user or calling party at the first communication device 22a, for example, can disconnect the multi-media communications formed with the second communication device 22b by hanging-up or going on hook. In this instance, the ingress AGW 28a sends a first H.225 Release Complete message to the GSX 26. Upon receiving the first H.225 Release Complete message from the ingress AGW 28a, the GSX 26 sends a second H.225 Release Complete message to the egress AGW 28b. The GSX 26 further generates a Stop CDR instruction for stopping the CDR associated with the GSX 26.

Furthermore, the Data Stream Integrator (DSI) (not shown) located on the GSX 26 uses the Stop CDR instruction as a trigger to generate an Automatic Message Accounting (AMA) record The ingress AGW 28a sends an H.323 DRQ message to the PSX 24. The PSX 24 sends a Disconnect Confirm message, such as an H.323 DCF, back to the ingress AGW 28a acknowledging the disconnect. The egress AGW 28b sends an H.323 DRQ message to the PSX 24 and the PSX 24 sends an H.323 DCF back to the egress access gateway 28b acknowledging disconnect. At this instant, the multi-media communications link previously formed between the first 22a and second 22b communication devices is disconnected.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto.

What is claimed is:

1. A method of processing multi-media service requests received at a multi-media services provider system, the method comprising:

receiving at least one service request message having a request for a predetermined service at a switching device located on the multi-media services provider system;

processing the at least one service request message at the switching device for generating a first processed service request message having the request for the predetermined service; and communicating the first processed service request message to an Internet-Protocol Segmentation Directory, wherein the Internet-Protocol Segmentation Directory processes the first processed service request message for generating a second processed service request message having the request for the predetermined service, and wherein the Internet-Protocol Segmentation Directory is adapted for communicating the second processed service request message to at least one predetermined Internet-Protocol Service Control Point of a plurality of Internet-Protocol Service Control Points for processing the predetermined service.

2. The method of claim 1, further comprising:

determining to communicate the second processed service request message to the at least one predetermined Internet-Protocol Service Control Point based on predetermined attributes of the predetermined service.

3. The method of claim 2, further comprising:

determining that the request for the predetermined service includes a request for a Software Defined Network service.

4. The method of claim 2, further comprising:

determining that the request for the predetermined service includes a request for toll-free service.

5. The method of claim 1, wherein generating the first processed service request message includes generating a first Info_Collected message.

6. The method of claim 5, wherein communicating the first processed service request message includes communicating the first Info_Collected message to the Internet-Protocol Segmentation Directory.

7. The method of claim 6, wherein generating the second processed service request message includes generating a second Info_Collected message.

8. The method of claim 7, wherein communicating the second processed service request message includes communicating the second Info_Collected message to the at least one predetermined Internet-Protocol Service Control Point.

9. The method of claim 1, wherein generating the first processed service request message includes generating an Info_Analyze message.

10. A multi-media services provider system for processing a plurality of requests for a plurality of multi-media services, the system comprising:

a switching device adapted to receive and process the plurality of requests for said plurality of multi-media services to generate a plurality of first processed requests for multi-media services;

at least one Internet-Protocol Segmentation Directory in communication with the switching device and being adapted to receive and process the plurality of first processed requests for multi-media services to generate a plurality of second processed requests for multi-media services; and a plurality of Internet-Protocol Service Control Points in communication with the at least one Internet-Protocol Segmentation Directory, wherein the at least one Internet-Protocol Segmentation Directory communicates at least one of the plurality of second processed service request messages to at least one Internet-Protocol Service Control Point of the plurality of Internet-Protocol Service Control Points based on predetermined attributes of the at least one of the plurality of second processed service request messages.

11. The system of claim 10, wherein the plurality of first processed requests for multi-media services includes a plurality of first Info_Collected messages.

12. The system of claim 10, wherein the plurality of second processed requests for multi-media services includes a plurality of second Info_Collected messages.

13. The system of claim 10, wherein the predetermined attributes of the at least one of the plurality of second processed service request messages includes predetermined information associated with requesting Software Defined Network service request processing.

14. The system of claim 10, wherein the predetermined attributes of the at least one of the plurality of second processed service request messages includes predetermined information associated with requesting toll-free service request processing.

15. The system of claim 10, wherein the switching device includes a Private Service Exchange.

\* \* \* \* \*